United States Patent [19]

Nishida et al.

[11] Patent Number: 5,230,411
[45] Date of Patent: Jul. 27, 1993

[54] NESTED PISTON HYDRAULIC OPERATOR FOR AUTOMATIC TRANSMISSION

[75] Inventors: Masaaki Nishida; Chihiro Hosono; Yoichi Hayakawa, all of Aichi, Japan

[73] Assignee: Aisin AW Co., Ltd., Japan

[21] Appl. No.: 752,536

[22] PCT Filed: Nov. 15, 1990

[86] PCT No.: PCT/JP90/01480
§ 371 Date: Sep. 6, 1991
§ 102(e) Date: Sep. 6, 1991

[87] PCT Pub. No.: WO91/07603
PCT Pub. Date: May 30, 1991

[30] Foreign Application Priority Data

Nov. 15, 1989 [JP] Japan ................. 1-294825

[51] Int. Cl.⁵ ............................................. F16D 21/00
[52] U.S. Cl. ......................... 192/48.8; 192/48.91; 192/87.11; 192/87.15
[58] Field of Search ............... 192/48.91, 87.11, 87.14, 192/87.15, 87.16, 48.8

[56] References Cited

U.S. PATENT DOCUMENTS

| Re. 27,937 | 3/1974 | Hensel | 192/87.11 |
|---|---|---|---|
| 3,747,730 | 7/1973 | Hause | 192/87.11 |
| 3,757,607 | 9/1973 | Malloy | 74/761 |
| 3,970,176 | 7/1976 | Bucksch | 192/87.11 |
| 4,010,833 | 3/1977 | Brendel et al. | 192/87.11 |
| 4,711,138 | 12/1987 | Miura et al. | 192/87.16 X |
| 4,716,787 | 1/1988 | Miura et al. | 192/87.11 X |
| 4,732,253 | 3/1988 | Hiramatsu et al. | 192/87.11 |
| 5,006,102 | 4/1991 | Takase et al. | 475/282 |
| 5,029,685 | 7/1991 | Takase et al. | 192/48.91 |

FOREIGN PATENT DOCUMENTS

| 2127827 | 2/1972 | Fed. Rep. of Germany . |
|---|---|---|
| 58-170925 | 10/1983 | Japan . |
| 61-19861 | 5/1986 | Japan . |
| 62-141344 | 6/1987 | Japan . |
| 62-233543 | 10/1987 | Japan . |
| 63-289358 | 11/1988 | Japan . |
| 2-163568 | 6/1990 | Japan . |

Primary Examiner—Rodney H. Bonck
Assistant Examiner—Andrea Pitts
Attorney, Agent, or Firm—Lorusso & Loud

[57] ABSTRACT

This invention relates to an automatic transmission for a motor vehicle. A plurality of brakes and clutches have heretofore been independently provided in the axial direction and engaging or disangaging has been made independently when a gear stage for each range is selected, so that the size in the axial direction could not be shortened. The present invention intends to resolve the above-described problem and provides an automatic transmission in which the size in the axial direction is shortened, so that two multi-disc clutches(C3, C0) indenpendently engageable with or disengageable from an outer cylinder(108) are provided in series in the axial direction, and grooves(125), through which penetrate upline tubes(126) extending between a first piston(110) and the clutch(C0), are provided at a plurality of positions in the clutch(C3). When a second piston(112) is operated, the clutch(C3) is engaged or disengaged. Furthermore, when the first piston(110) is operated, the upline tube(126) extending between the first piston(110) and the clutch(C0) is operated togather with the first piston(110), whereby the clutch(C0) is engaged or disengaged. For this reason, according to the present invention, no interference takes place between the both clutches(C0, C3) when one clutch(C0) is released in a state where the other clutch(C3) is engaged.

4 Claims, 7 Drawing Sheets

| | | SOLENOID | | | CLUTCH | | | | BRAKE | | O.W.C. | | GEAR RATIO |
|---|---|---|---|---|---|---|---|---|---|---|---|---|---|
| | | NO.1 | NO.2 | NO.3 | C0 | C1 | C2 | C3 | B1 | B2 | F0 | F1 | |
| P | | ○ | × | × | × | × | × | × | × | × | × | × | |
| R | V≤7 | ○ | × | × | × | × | ○ | × | × | ○ | × | × | 2.769 |
| | V>7 | × | ○ | × | × | × | ○ | × | × | × | × | × | |
| N | | ○ | × | × | × | × | × | × | × | × | × | × | |
| D | 1ST | ○ | × | × | × | ○ | × | × | × | × | ○ | ○ | 2.807 |
| | 2ND | ○ | ○ | × | × | ○ | × | × | ○ | × | ○ | × | 1.479 |
| | 3RD | × | ○ | ◎ | ○ | ○ | × | ○ | ◎ | × | ○ | × | 1.000 |
| | 4TH | × | × | ◎ | ○ | ○ | × | × | ○ | × | × | × | 0.735 |
| 2 | 1ST | ○ | × | × | × | ○ | × | ○ | × | × | ○ | ○ | |
| | 2ND | ○ | ○ | × | × | ○ | × | × | ○ | × | ○ | × | |
| | 3RD | × | ○ | × | ○ | ○ | × | ○ | ◎ | × | ○ | × | |
| | (3RD) | × | × | × | ○ | ○ | × | ○ | ◎ | × | ○ | × | |
| 1 | 1ST | ○ | × | × | × | ○ | × | ○ | × | ○ | ○ | ○ | |
| | 2ND | ○ | ○ | × | × | ○ | × | × | ○ | × | ○ | × | |
| | (2ND) | × | ○ | × | × | ○ | × | ○ | ○ | × | ○ | × | |
| | (1ST) | × | × | × | × | ○ | × | ○ | × | ○ | ○ | ○ | |

| REMARKS | | | |
|---|---|---|---|
| | ○ | ON | ENGAGE |
| | × | OFF | RELEASE |
| | ◎ | ON: L-up ON / OFF: L-up OFF | B1 RELEASED ON RELEASE PRESSURE |

Fig.6

NESTED PISTON HYDRAULIC OPERATOR FOR AUTOMATIC TRANSMISSION

TECHNOLOGICAL FIELD

The present invention relates to an automatic transmission for an automobile.

BACKGROUND TECHNOLOGY

In the prior art, an automatic transmission for an automobile has a plurality of planetary gear sets and frictional engagement components such as brakes or clutches connected with the individual components of the planetary gear sets, so that it can establish a plurality of gear stages by engaging the individual frictional engagement components selectively. Moreover, each of the brakes and clutches is composed of a hydraulic servo and a plurality of discs to be engaged or released by the hydraulic servo. This hydraulic servo is composed of an annular cylinder and an annular piston, slidably mounted in the annular cylinder. The discs are engaged by introducing the working oil into the cylinder chamber formed between the cylinder and piston and released by draining the working oil.

The aforementioned plural brakes and clutches are arranged in the axial direction within the transmission casing of the automatic transmission.

In the automatic transmission thus constructed, however, the individual brakes and clutches have to be engaged or released independently of one another, in selecting a gear stage within a range, so that they have to be arranged independently of one another.

This arrangement has made it impossible to shorten the axial size of the automatic transmission.

DISCLOSURE OF THE INVENTION

An object of the present invention is to solve the aforementioned problems of the existing automatic transmission and to provide an automatic transmission which can have its axial size reduced. In order to achieve the above specified object, according to the present invention, there is provided an automatic transmission which comprises: an outer cylinder 108; an inner cylinder 104 fixed in said outer cylinder for forming a first annular cylinder chamber 109; a first annular piston 110 arranged slidably in said first annular cylinder chamber 109 for forming a second annular cylinder chamber 111 between itself and said inner cylinder 104; and a second annular piston 112 arranged slidably in said second annular cylinder chamber 111, so that said outer cylinder 108, said first annular piston 110 and said second annular piston 112 form together two hydraulic servos $C_0$ and $C_3$.

In said outer cylinder 108, there are arranged axially in tandem two sets of multi-disc clutches C3 and C0 which are engaged or released independently of each other. C3 is engaged or released by said second annular piston 112 and is formed with a plurality of axial grooves 125 in its peripheral edge portion. Apply tube 126 extends through grooves 125 between said first annular piston 110 and said multi-disc clutch C0 for engagement or release of C0 by said first annular piston 110.

Moreover, the multi-disc clutch C0 to be engaged or released by said first annular piston 110 and the multi-disc clutch C3 to be engaged or released by said second annular piston 112 are both engaged at one of the gear stages and one is released at other gear stages.

As described above, the automatic transmission according to the present invention comprises: the outer cylinder 108; the inner cylinder 104 fixed in said outer cylinder 108 for forming the first annular cylinder chamber 109; the first annular piston 110 arranged slidably in said first annular cylinder chamber 109 and forming the second annular cylinder chamber 111 between itself and said inner cylinder 104. The second annular piston 112 is arranged slidably in said second annular cylinder chamber 111, so that the outer cylinder 108, the first annular piston 110 and the second annular piston 112 form together the two hydraulic servos $C_0$ and $C_3$. As a result, the outer cylinder 108, a spring 114 and a spring retainer 113 can be shared to shorten the axial size. Within the outer cylinder 108 are arranged axially in tandem the two sets of multi-disc clutches C0 and C3 which are to be engaged or released independently of each other. C3 is engaged or released by said second annular piston 112 and is formed with plural axially extending grooves 125 in its peripheral edge portion. The apply tube 126 extends between the first annular piston 110 and the multi-disc clutch C0 through said grooves 125. As a result, no interference between the two clutches C0 and C3 occurs when clutch C0 is to be released while C3 is being engaged.

BEST MODE FOR CARRYING OUT THE INVENTION

The present invention will be described in detail in the following in connection with the embodiments thereof with reference to the accompanying drawings.

A four-speed automatic transmission A according to the present invention is constructed of a torque converter 50 having a lockup clutch L/C, a four-speed shift gear mechanism 1, a reduction mechanism 51 and a differential mechanism 52.

The four-speed shift gear mechanism 1 is equipped with a planetary gear unit 12 which is made by coupling a single planetary gear 10 and a dual planetary gear 11. This gear unit 12 has its sun gears S1 and S2 integrated into a sun gear S. Moreover, pinions P1 and P1', meshing with the sun gears S1 and S2 share a carrier CR. This carrier CR also supports a pinion P2 meshing with a ring gear (as will be referred to as the "large ring gear") R2 of the dual planetary gear 11.

Moreover, an input shaft 15 extending from the output member of the torque converter 50 is connected through a first clutch C1 to a connecting member 16 and through a second clutch C2 to the sun gear S. Between the connecting member 16 and the ring gear (as will be referred to as the "small ring gear") R1 of the single planetary gear 10, there are interposed the third clutch C3 and a second one-way clutch F0. A fourth clutch C0 is interposed between the connecting member 16 and the large ring ear R2. On the other hand, the aforementioned sun gear S can be stopped by a first brake B1 which is a band brake. Between the large ring gear R2 and a casing 17, there are interposed a second brake B2 and a first one-way clutch F1. Moreover, the carrier CR is connected to an output gear 13 which is positioned generally at the center of the shift gear mechanism 1.

The reduction mechanism 51 is equipped with a counter shaft 54 which is rotatably supported by the casing 17. On the counter shaft 54, there are fixed a large gear 53 meshing with the aforementioned output gear 13 at all times, and a small gear 55. On the other hand, the differential mechanism 52 is composed of a differential pinion 56 and left-hand and right-hand pinions 57a and 57b meshing with each other. These pinions 57a and 57b are fixed on left-hand and right-hand front axles 59a and 59b, respectively. The differential pinion 56 is supported by a differential carrier 60 which in turn is rotatably supported by the casing 17. On the differential carrier 60, there is fixed a ring gear 61 which meshes with the aforementioned small gear 55 at all times.

Figure 4A:
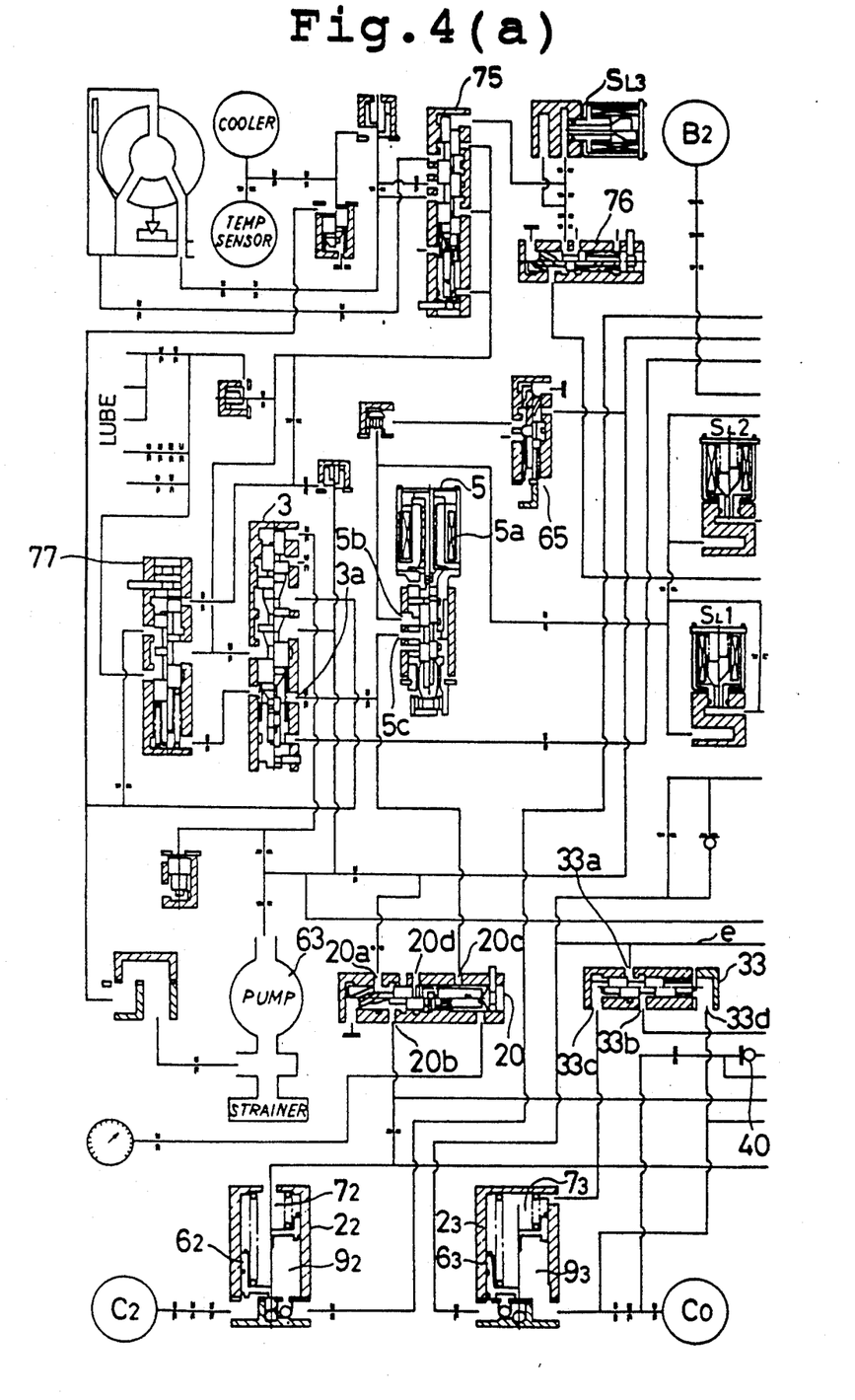
FIGS. 4(a) and 4(b) diagrams showing the hydraulic control system of the automatic transmission of the present invention.
Figure 4B:
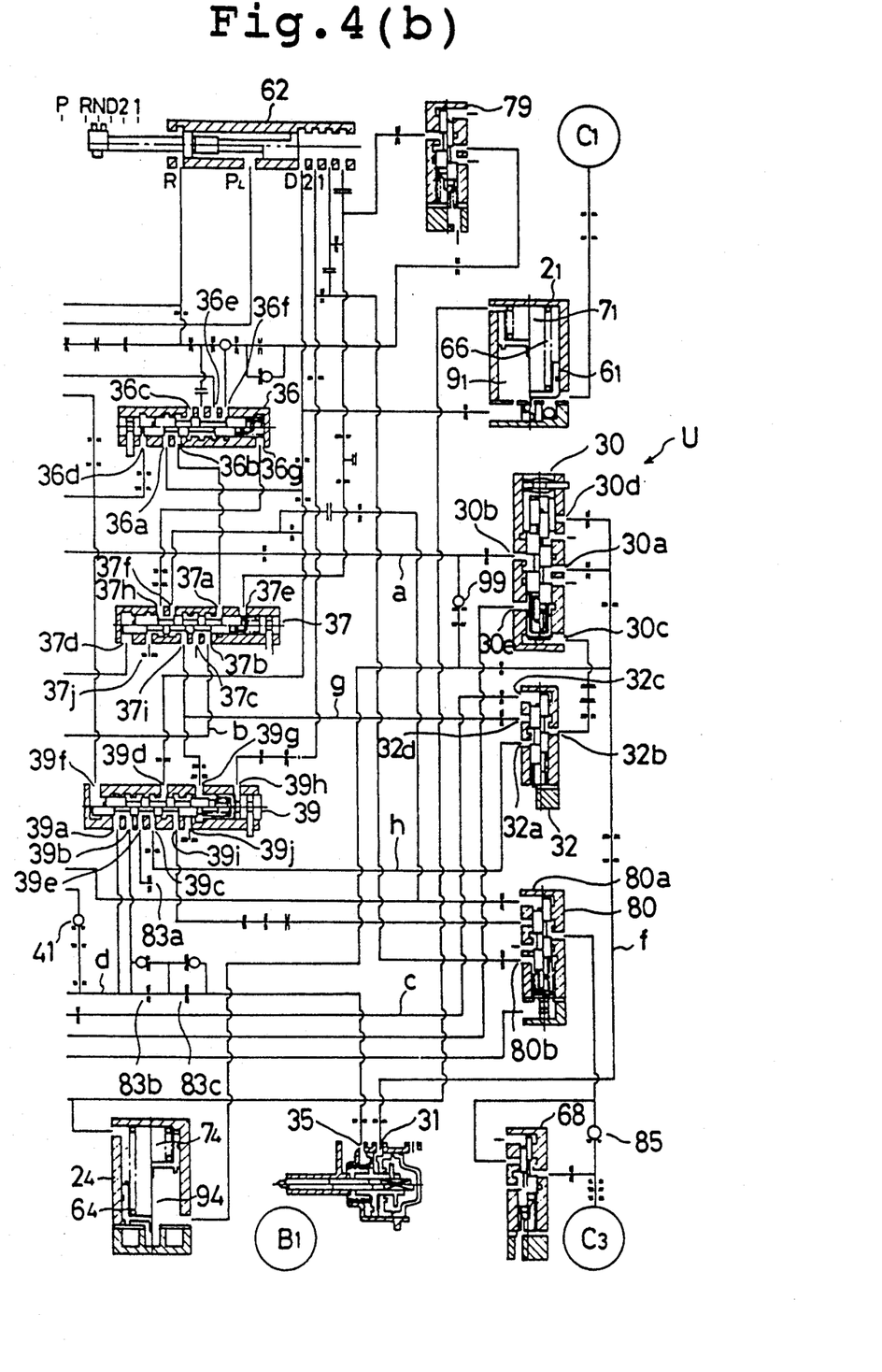

FIGS. 4(a) and 4(b), show hydraulic control system U equipped with hydraulic servos $C_1$, $C_2$, $C_3$ and $C_0$, and $B_1$ and $B_2$ for actuating the clutches C1, C2, C3 and C0 and the brakes B1—and B2, respectively. Of these, the first clutch hydraulic servo $C_1$, the second clutch hydraulic servo $C_2$, the fourth clutch hydraulic servo $C_0$, and the first brake hydraulic servo $B_1$ are respectively arranged with accumulators $2_1$, $2_2$, $2_3$ and $2_4$ in parallel therewith.

Manual valve 62 has its oil passages switched by the shifting operations of the driver to establish selected ranges. The manual valve 62 has a D port communicating with a line pressure passage PL in the D range; its D and 2nd ports communicates with PL in the 2nd range; its D, 2nd and 1st ports communicate with PL in the 1st range; and its R port communicates with PL in the R range.

A primary regulator valve 3 is actuated by a throttle pressure or the oil pressure coming from the R range port to regulate the oil pressure coming from a pump 63 to generate the line pressure. Numeral 5 designates a throttle pressure control valve which is controlled by an electric signal based upon the throttle opening to generate a predetermined throttle pressure (Pth).

The throttle pressure control valve 5 is equipped with a solenoid 5a, which is controlled by the electric signal coming from a not-shown control unit, and has an input port 5b and an output port 5c. The throttle pressure Pth coming from the output port 5c is fed to a throttle pressure port 3a of the primary regulator valve 3 and to a feedback port 20c of an accumulator control valve 20.

Solenoid modulator valve 65 modulates the line pressure and feeds the modulated line pressure to the input port 5b of the throttle pressure control valve 5. The accumulator control valve is equipped with not only an input port 20a but also a control port 20b and the feedback port 20c. The oil pressure at the control port 20b is fed to the back pressure chambers $7_1$ to $7_4$ of the aforementioned accumulators $2_1$ to $2_4$.

Moreover, these accumulators $2_1$ to $2_4$ are equipped with pistons $6_1$ to $6_4$ which have their front faces defining accumulator chambers $9_1$ to $9_4$ communicating with the individual hydraulic servos and have their back faces defining the back pressure chambers $7_1$ to $7_4$ having pressure receiving areas equal to those of the accumulator chambers. At the front faces of the pistons $6_1$ to $6_4$, there are disposed a shorter spring 66 and a longer spring 67, as exemplified in the accumulator $2_1$.

Moreover, all of these accumulators are made to have an identical shape and to share common parts.

The third clutch hydraulic servo $C_3$ is equipped with a modulator valve 68, but the second brake hydraulic servo $B_2$ is fed either directly with the line pressure or indirectly with the modulator pressure through the modulator valve. Thus, neither of these hydraulic servos $C_3$ and $B_2$ is equipped with an accumulator. A 1-2 shift valve 36 and a 3-4 shift valve 39 are controlled by a second solenoid valve SL2; and a 2-3 shift valve 37 is controlled by a first solenoid valve $S_L1$. The 1-2 shift valve 36 is formed with a control oil chamber 36d exposed to the control oil pressure coming from the solenoid valve $S_L2$; a line pressure supply port 36a communicating the with D range port; an output port 36b; a drain port 36c; a B2 port 36e; a low modulator port 36f; and a constraining control oil chamber 36g. The 1-2 shift valve 36a is held in its lower half position in the 2nd, 3rd and 4th speeds and is switched to its upper half position in 1st speed.

On the other hand, the 2-3 shift valve 37 is formed with: a control oil chamber 37d exposed to the control oil pressure coming from the solenoid valve $S_L1$; an input port communicating with an oil line a leading from the output port of the aforementioned 1-2 shift valve 36; an output port 37b communicating with the fourth clutch hydraulic servo $C_0$ via an oil line b; a drain port 37c; a 1st range constraining control oil chamber 37e; a D range line pressure supply port 37f; a port 37h communicating with the constraining control oil chamber 36g of the aforementioned 1-2 shift valve 36; a port 37i; and a drain port 37j. The -3 shift valve is held in its lower half position in the 1st and 2nd speeds and is switched to its upper half position in the 3rd and 4th speeds.

On the other hand, the 3-4 shift valve 39 is formed with: a control oil chamber 39f exposed to the control oil pressure coming from the solenoid valve $S_L2$; a $C_0$ port 39a; a $B_1$ release port 39b; a drain port 39e; a constraining control oil chamber 39g communicating with the aforementioned port 37i; a 2nd range constraining control oil chamber 39h; a $C_3$ port 39i; and a—drain port 39j. The 3-4 shift valve 39 is held in its lower half position in the 1st, 2nd and 3rd speeds and is switched to its upper half position in the 4th speed.

On the other hand, numeral 30 designates a $B_1$ modulator valve, which is formed with: a line pressure supply port 30b communicating with the oil line a leading from the output port 36b of the aforementioned 1-2 shift valve 36; a pressure modulation port 30a; a feedback port 30d; 8 constraining control oil chamber 30c; and a control oil chamber 30e communicating with the pressure control port 20b of the accumulator control valve 20. The $B_1$ modulator valve 30 reduces the line pressure coming from the line pressure supply port 30b by a predetermined ratio and outputs it to the pressure modulation port 30a, when no constraining control oil pressure is exerted upon the control oil chambers 30c and 30e.

B1 modulator control valve 32 is formed with: a first input port 32d communicating with an oil line g leading from the port 37i of the aforementioned 2-3 shift valve 37; a second input port 32a communicating with an oil line h leading from the port 39c of the aforementioned 3-4 shift valve 39; and an output port 32b communicating with the constraining control oil chamber 30c of the $B_1$ modulator valve 30. The $B_1$ modulator control valve 32 has its first input port 32d and output port 32b communicating with each other, when a control oil chamber 32c communicating with the hydraulic servo $C_0$ via an oil line c is relieved, and its second input port 32a and output port 32b communicating with each other when the control oil chamber 32c is fed with the oil pressure.

On the other hand, a 2-3 timing valve 33, which branches from the oil line b providing the communication between the output 37b of the 2-3 shift valve 37 and the fourth clutch hydraulic servo $C_0$, is formed with: an input port 33a communicating with the output port 37b; an output port 33b communicating with the port 39a of the 3-4 shift valve 39; a first control oil chamber 33d communicating with the hydraulic servo $C_0$; and a second control oil chamber 33c communicating with 20. When the oil pressure of the hydraulic servo $C_0$ rises to a predetermined level, the 2-3 timing valve 33 has its input port 33a and output port 33b communicating with each other.

In an oil line d providing the communication between the hydraulic servo $C_0$ and the port 39a, there is disposed a check ball 40 for admitting the flow from the hydraulic servo $C_0$ to the port 39a. In an oil line e leading from oil line d to the aforementioned oil line b, there is disposed a check ball 41 for allowing the oil to be discharged from the port 39a to the port 37b.

Incidentally, numeral 75 designates a lockup clutch control valve; numeral 76 designates a lockup clutch modulator valve; and $S_L3$ designates a lockup clutch controlling solenoid valve. These valves are properly controlled at the gear stages which are indicated by double circles in the operation table of FIG. 5. Moreover, numeral 77 designates a second regulator valve, and numeral 80 designates a C3 timing valve.

Next, the operations of the present embodiment will be described in the following.

Figure 5:
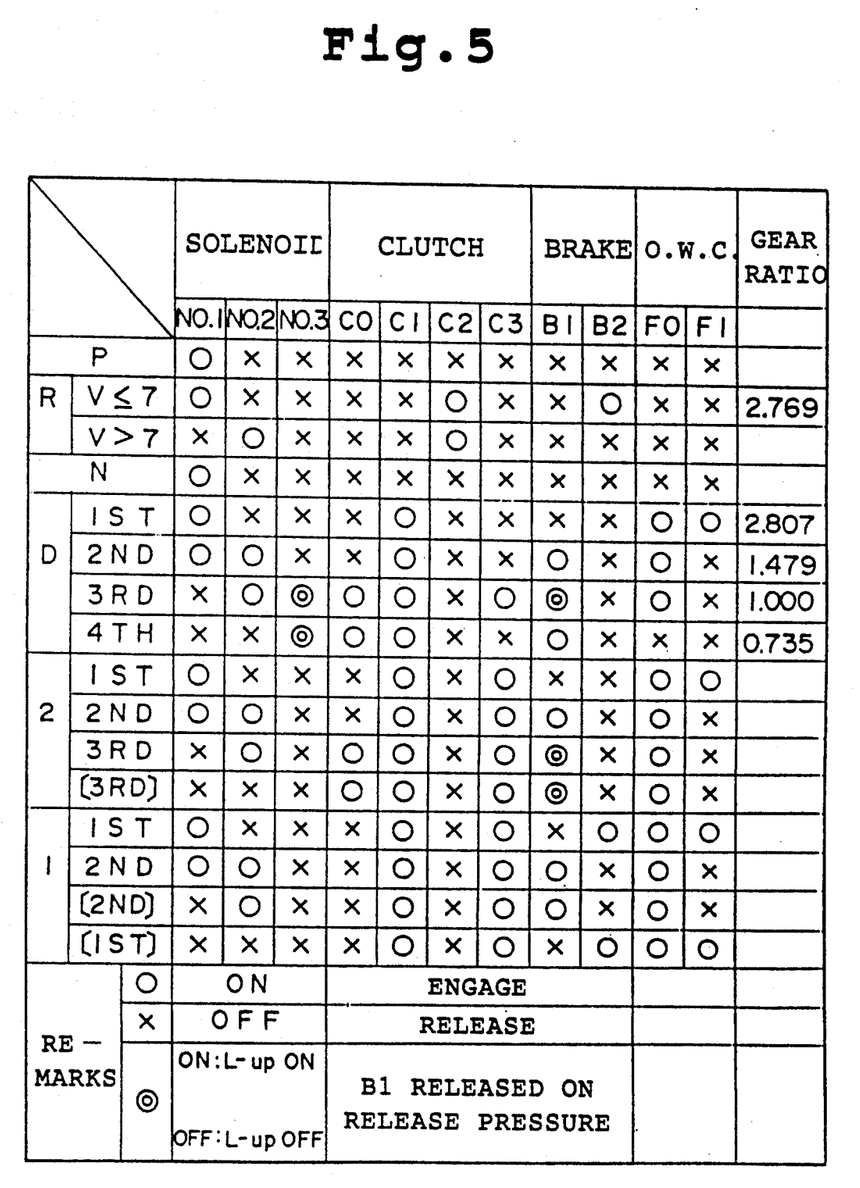
FIG. 5 is a table enumerating the operations of the automatic transmission of the present invention.

In the 1st speed in which the manual valve 62 is shifted to the D range, as shown in FIG. 5, the first solenoid valve $S_L1$ only is ON in the drain state, but the second solenoid valve $S_L2$ is OFF in the supply state.

In this state, oil pressure is received in chamber 36d of the 1-2 shift valve 36 which is in the illustrated upper half position, and the 2-3 shift valve 37 has its control oil chamber 37d relieved from the oil pressure and is in its lower half position. The 3-4 shift valve 39 receives oil pressure in its control oil chamber 39f but is constrained in its lower half position because its constraining control oil chamber 39g is fed with the line pressure from the line pressure supply port 37f of the 2-3 shift valve 37.

As a result, the first clutch hydraulic servo $C_1$ only receives the line pressure from the D range port of the manual valve 62, i.e. no other hydraulic servo is supplied with the line pressure. At this time, the throttle pressure control valve 5 is operated to generate the predetermined throttle pressure Pth on the basis of the signal coming from the control unit. The throttle pressure Pth is applied to the signal port 20c of the accumulator control valve 20 so that the line pressure supplied to the input port 20a is reduced by a predetermined ratio by the feedback pressure, and this reduced oil pressure is fed from the output port 20b to the back pressure chambers $7_1$ to $7_4$ of the individual accumulators $2_1$ to $2_4$.

As a result, in the accumulator $2_1$ communicating with the hydraulic servo $C_1$, the oil pressure of the back pressure chamber 71 is properly controlled in accordance with the engagement characteristics of the first clutch C1 by the throttle pressure control valve 5 so that clutch C1 is smoothly engaged. Simultaneously with this, not only the line pressure is regulated by the primary regulator valve 3, but also the pressures in the back pressure chambers $7_2$ to $7_4$ of the remaining accumulators $2_2$ to $2_4$ are controlled on the basis of the controls of the throttle pressure control valve 5, but the remaining clutches C0, C2 and C3 and the brakes B1 and B2 are out of engagement and are not influenced in the least.

Figure 2:
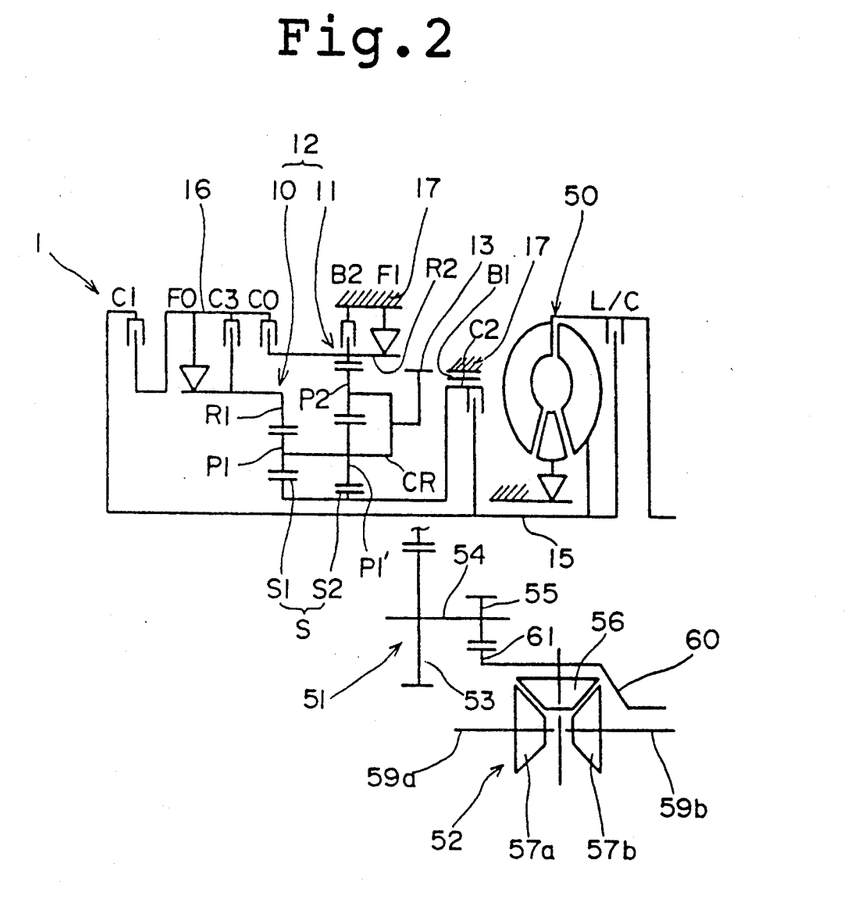
FIG. 2 is a skeleton diagram showing an automatic transmission of the present invention.
Figure 3:
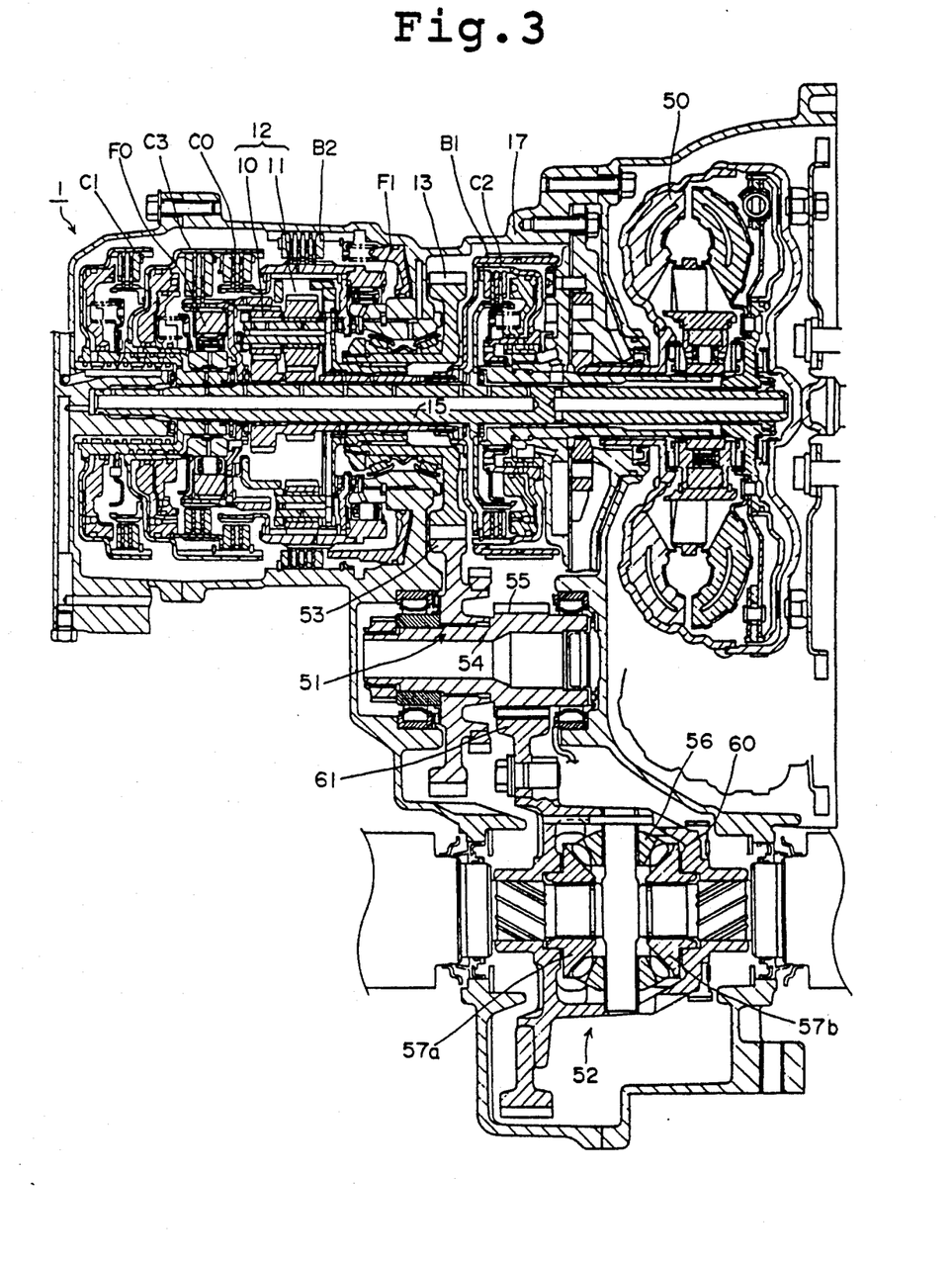
FIG. 3 is a section showing the automatic transmission of the present invention.

In the 1st speed state, moreover, in which not only the first clutch C1 but also the first and second one-way clutches F1 and F0 are engaged, the rotation of the input shaft 15 is transmitted to the smaller ring gear R1 through the first clutch C1 and the second one-way clutch F0. Since, in this state, the rotation of the larger ring gear R2 is blocked by the first one-way clutch F1, the carrier CR is drastically decelerated, while allowing the sun gear S to rotate idly, so that the decelerated rotation is extracted from the output gear 13. Moreover, the rotation of this output gear 13 is decelerated by the reduction mechanism 51 and transmitted to the left-hand and right-hand accelerator shafts 59a and 59b by the differential mechanism 52.

In the 2nd speed state, on the other hand, the second solenoid valve $S_L2$, as well as the first solenoid valve $S_L1$, is turned ON. Then, the 2-3 shift valve 37 and the 3-4 shift valve 39 are held in their lower half positions, and the 1-2 shift valve 36 is switched to its lower half position by relief of oil pressure from its control oil chamber 36d. In this state, the via the line pressure of the D range port is applied to the oil line a further to the line pressure port 30b of the $B_1$ modulator valve 30.

In second speed, the 2-3 shift valve 37 has its D range line pressure supply port 37f and port 37i in communication with each other, and the line pressure from said D range line pressure supply port 37f i8 applied via the port 37i and the oil line g to the first input port 32d of the B modulator control valve 32. In the first and second speeds the control valve 32 is in its upper half position so that the oil pressure at its input port 32d is applied via the output port 32b to the constraining control oil chamber 30c of the $B_1$ modulator valve 30.

As a result, modulator valve 30 is constrained in its left-hand half position, and the line pressure at the aforementioned line pressure supply port 30b is output without any change to the pressure modulation port 30a and applied by way of an oil line f to the brake engaging oil pressure chamber 3l of the first brake hydraulic servo $B_1$. As a result, the first brake B1 has its band fastened by the intensive force based upon the line pressure.

At the time of an upshift from the 1st to 2nd speeds, too, the throttle pressure control valve 5 is controlled as in the aforementioned shift to the D range by the electric signal coming from the control unit, and the line pressure is applied to the back pressure chambers $7_1$ to $7_4$ of the accumulators $2_1$ to $2_4$ by the throttle pressure control valve 5. As a result, the B1 brake hydraulic servo $B_1$ is properly adjusted in accordance with the engagement characteristics of brake B1 by having its accumulator $2_4$ controlled to a proper back pressure so that the first brake $B_1$ is smoothly engaged. At the same time, the accumulators $2_1$, $2_2$ and $2_3$ for the remaining clutches C1, C2 and C0 have their back pressures controlled. However, the second clutch C2 and the fourth clutch C0 are in their released states and receive no influence. In the first clutch C1, the hydraulic servo $C_1$ has its actuating pressure changed with the change in the line pressure based upon the throttle pressure change. However, this clutch C1 is already in the engaged static friction state, and the engaging oil pressure is at a level far higher than the torque load of the clutch, so that the clutch C1 does not slip.

In the 2nd speed state, moreover, in which the first brake B1 and the second one-way clutch F0 as well as the first clutch C1 are engaged, the rotation of the input shaft 15 is transmitted through the first clutch C1 and the second one-way clutch F0 to the smaller ring gear R1, and the sun gear S is stopped by the first brake B1. As a result, the rotation of the smaller ring gear R1 is extracted as the 2nd speed rotation from the carrier CR while allowing the larger ring gear R2 to rotate idly. Here in this 1st to 2nd speed shift, the first one-way clutch F1 overruns to prevent shift shock, which might otherwise be caused by the engagement change.

In the 3rd speed state the second solenoid valve $S_L 2$ is maintained in its ON state, and the first solenoid valve $S_L 1$ is switched to its OFF state. In this state, the 1-2 shift valve 36 and the 3-4 shift valve 39 are held in their lower half positions, and the 2-3 shift valve 37 is switched to its upper half position by having its control oil chamber 37d fed with the oil pressure. As a result, the line pressure in the oil line a, which is supplied via the 1-2 shift valve ports 36a and 36b, is introduced via the input port 37a and the output port 37b into the oil line b so that it is supplied to the fourth clutch hydraulic servo $C_0$ and the accumulator chamber $9_3$ of the accumulator $2_3$.

In the 2-3 shift valve 37 port 37i switched from communication with the D range line pressure supply port 37f to communication with the drain port 37c so that the oil pressure to the first input port 32d of the $B_1$ modulator control valve 32 is drained. Moreover, the oil pressure supplied to the hydraulic servo $C_0$ is exerted via the oil line c upon the constraining control oil chamber 80b of the C3 timing valve 80 to switch valve 80 to the right-hand half position. As a result, the line pressure from the line pressure port 39d of the 3-4 shift valve 39 is supplied via the port 39i8 to the input port of the C3 timing valve 80 and further via the output port and the modulator valve 68 to the third clutch hydraulic servo $C_3$.

When the oil pressure of the fourth clutch hydraulic servo $C_0$ and its accumulator $2_1$ rises to a predetermined level, it is applied to the first control oil chamber 33d of the 2-3 timing valve 33 so that this valve 33 is switched to its upper half position. As a result, the oil pressure from the oil line b is quickly applied to the oil line d via the line pressure supply port 33a and the output port 33b and further to the brake releasing oil pressure chamber 35 of the first brake hydraulic servo $B_1$ via the ports 39a and 39b.

In this state, moreover, the oil pressure of the hydraulic servo $C_0$ is exerted via the oil line c upon the control chamber 32c of the $B_1$ modulator control valve 32 to switch this valve 32 to its left-hand half position. However, the 3-4 shift valve 39 has its port 39c in communication with the drain port 39e, and the $B_1$ modulator control valve 32 has its second input port 32a as well as its first input port 32d drained. As a result, the $B_1$ modulator valve 30 is in its pressure modulating state so that its line pressure supply port 30b has its line pressure reduced by a predetermined ratio by the feedback pressure of the feedback port 30d. Thus, the modulator pressure is fed through the oil line f to the brake engaging oil pressure chamber 31 of the first brake hydraulic servo $B_1$.

As a result, in this hydraulic servo $B_1$, the line pressure acting upon the brake releasing oil pressure chamber 35 overcomes the modulator pressure acting upon the brake engaging oil pressure chamber 31 to release the band brake B1. At this time, the oil pressure of the hydraulic servo $C_0$ communicating with the accumulator $2_1$ is boosted to switch the 2-3 timing valve 33. As a result, the oil pressure is prevented from being quickly supplied to the brake releasing oil pressure chamber 35. Thus, the first brake B1 is prevented from being released prior to the engagement of the fourth clutch C0, and, accordingly, return to the first speed state, for even an instant, is prevented.

In shifting from 2nd to 3rd speed, the throttle pressure control valve 5 is also controlled by the electric signal, and the line pressure is controlled according to the throttle pressure by the accumulator control valve 20. This controlled pressure is supplied to the back pressure chambers $7_1$ to $7_4$ of the accumulators $2_1$ to $2_4$ and to the second control chamber 33d of the 2-3 timing valve 33. As a result, the accumulator back pressure control is performed as before on the basis of the throttle pressure control valve 5, and the oil pressure of the hydraulic servo $C_0$ is controlled to match the engagement characteristics of the clutch C0 so that clutch C0 is smoothly engaged. At the same time, the switching timing of the timing valve 33 is properly adjusted to time the engagement of the fourth clutch C0 and the release of the first brake B1 properly. Simultaneously with this, the control oil chamber 30e of the B modulator valve 30 is also supplied with the oil pressure from the output port 20b of the accumulator control valve so that its modulator pressure is properly modulated to a higher level. The oil pressure thus modulated is supplied via the oil line f to the brake engaging oil pressure chamber 31 to time the release of the brake B1 properly in accordance with the control of the aforementioned timing valve 33.

In the 3rd speed state, on the other hand, in which the third clutch C3 and the fourth clutch C0 as well as the first clutch C1 are engaged whereas the first brake B1 is released, the rotation of the input shaft 15 is transmitted through the one-way clutch F0 and the third clutch C3 to the smaller ring R1 and further through the fourth clutch C0 to the larger ring gear R2 so that the integral rotations of the planetary gear unit 12 are extracted from the carrier CR to the output gear 13.

At this time, the engagement change between the fourth clutch C0 and the first brake B1 occurs. However, no shift shock will take place because proper timing is provided, as described above and because the shifts via other gear stages are blocked. Simultaneously with this, moreover, the third clutch C3 is also engaged, and the timing of this engagement may be slow because the clutch C3 is in parallel with the second one-way clutch F0.

In the 4th speed state, the first solenoid valve $S_L 1$ is OFF, and the second solenoid valve $S_L 2$ is switched OFF. In this state, the 2-3 shift valve 37 is held in its upper half position, and the 3-4 shift valve 39 is switched to its upper half position by having its control chamber 39f fed with the control oil pressure. On the other hand, the 1-2 shift valve 36 has its control oil chamber 36d fed with the control oil pressure but its constraining control oil chamber 36g is fed with the line pressure from the line pressure supply port 37f of the 2-3 shift valve 37 via the port 37h, so that the 1-2 shift valve 36 is held in its lower half position. As a result, the 3-4 shift valve 39 has its $B_1$ relief port 39b in communication with the drain port 39e so that the brake engaging oil pressure chamber 31 of the first brake hydraulic servo $B_1$ is drained. In 3rd speed, since the oil pressure is supplied to the fourth clutch hydraulic servo $C_0$, the oil pressure is supplied via the oil line c to the control oil chamber 32c of the B1 modulator control valve 32 so that this valve 32 is switched to its lower half position in which the second input port 32a and the output port 32b are in communication with each other. If, in this state, the 3-4 shift valve 39 is switched at the 4th speed to bring its line pressure supply port 39d in communication with the port 39c, the line pressure is fed via the port 39d and 39c and the ports 32a and 32b of the $B_1$ modulator control valve to the constraining control oil chamber 30c of the $B_1$ modulator valve 30 so that this modulator valve 30 is switched to the line pressure supply state in which the line pressure port 30b and the pressure modulation port 30a are in communication with each other. As a result, the line pressure is introduced as is to the oil line f via the ports 30b and 30a so that the oil pressure supplied to the brake engaging oil pressure chamber 31 of the first brake hydraulic servo $B_1$ is switched from the modulator pressure to the line pressure. At this time, as before, the shift can be smoothed by controlling the oil pressure supplied to the back pressure chamber $7_4$ of the accumulator $2_4$ on the basis of the electric control of the throttle pressure control valve 5. Despite this fact, however, the engagement of the first brake B1 is controlled by adjusting the drain oil pressure from the brake releasing oil pressure chamber 35 by means of orifices 83a, 83b, 83c and so on.

Since the 3-4 shift valve 39 has its C3 timing port 39i in communication with the drain port 39j, the oil pressure of the third hydraulic servo $C_3$ is drained through a check valve 85 and the C3 timing valve 80 and via the ports 39i and 39j of the 3-4 shift valve 39.

In the 4th speed state, the throttle pressure control valve 5 is controlled at a rather high level by the electric signal coming from the control unit, and the accumulator back pressure or the output pressure of the accumulator control valve 20 is also set to a rather high level.

In the 4th speed state, the first clutch C1 and the fourth clutch C0 are in their engaged states, and the first brake B1 is switched to its engaged state whereas the third clutch C3 is switched to its released state. In this manner, the rotation of the input shaft 15 is transmitted through the fourth clutch CO to the larger ring gear R2. At the same time, the sun gear S is stopped by the first brake B1 so that the rotation of the larger ring gear R2 rotates the carrier CR at a high speed while rotating the ring gear R1 idly. The rotation of the carrier CR is transmitted to the output gear 13. At this, time, the first brake B1 is engaged, and the third clutch C3 is released. Even if, however, the third clutch C3 is prematurely released, the 3rd speed state is maintained by the second one-way clutch F0. As a result, the shift shocks, which might otherwise be caused by the engagement change, can be prevented by delaying the engagement of the first brake B1 by means of the orifices 83a to 83c.

In downshifting from the 4th to 3rd speed the 3-4 shift valve 39 is switched to its lower half position, as has been described hereinbefore, the oil pressure of the oil line b is supplied via the ports 39a and 39b to the brake releasing oil pressure chamber 35 of the first brake hydraulic servo $B_1$, and the line pressure from the line pressure supply port 39d is supplied via the port 39i and through the C3 timing valve 80 and the C3 modulator valve 68 to the third clutch hydraulic servo $C_3$. At this time, the release oil pressure supplied to the brake releasing oil pressure chamber 35 of the hydraulic servo B is controlled by means of the orifices 83b and 83c, and the second one-way clutch F0 is switched from overrun to engagement, so that the shift can be smoothly effected.

In downshifting from the 3rd to 2nd speed the 2-3 shift valve 37 is switched to its lower half position, as has been described hereinbefore, to bring its C0 port 37b and drain port 37c into communication with each other. Then the oil pressure in the brake releasing oil pressure chamber 35 of the hydraulic servo B is drained first from the drain port 37c via the ports 39b and 39a, the oil line d, the oil line e, the oil line b and the port 37b, and the oil pressure of the third clutch-hydraulic servo $C_0$ is drained together with the oil pressure of the accumulator chamber $9_3$ of the accumulator $2_3$ from the drain port 37c via the oil line b and the port 37b. As a result, the release of the fourth clutch C0 is delayed relative to the engagement of the first brake B1 to thereby prevent shifting from the 3rd through 1st to 2nd speeds, namely, the shift which would pass through the 1st speed state wherein both the fourth clutch C0 and the first brake B1 are released. Further, in downshifting from the 3rd to 2nd speed, the C3 timing valve 80 is switched to its left-hand half position by having its constraining control oil chamber 80b relieved from the oil pressure based upon the hydraulic servo $C_0$, 80 that the oil pressure of the hydraulic servo $C_3$ is drained via the check valve 85 from the drain port of the C3 timing valve 80.

At the downshift from the 2nd to 1st speed, moreover, the 1-2 shift valve 36 is switched to its upper half position to bring its output port 36b into communication with its drain port 36c. As a result, the oil pressure of the brake engaging oil pressure chamber 3I of the first brake hydraulic servo $B_1$ is discharged to the drain port 36c from the oil line f, the ports 30a and 30b of the $B_1$ modulator valve 30, the check valve 99, the oil line a and the port 36b.

In kickdown from the 4th to 2nd speeds, on the other hand, the 3-4 shift valve 39 is switched to its lower half position, and the 2-3 shift valve 37 is also switched to its lower half position. As a result, the oil pressure of the fourth clutch hydraulic servo $C_0$ is discharged from the drain port 37c via the oil line b and the port 37b, and the oil pressure of the brake releasing oil pressure chamber 35 of the first brake hydraulic servo $B_1$ is also discharged from the drain port 37c via the ports 39a and 39b, the oil line d, the check valve 41, the oil lines e and a and the port 37b.

At this time, the B1 modulator control valve 32 is switched to its right-hand half position by relief of pressure from its control oil chamber 32c. At the same time, the $B_1$ modulator control valve 32 has its input port 32a drained to relieve the constraining pressure of the constraining control oil chamber 30c of the $B_1$ modulator valve 30 so that valve 30 generates the modulator valve pressure. However, the $B_1$ modulator valve 30 is constrained in its line pressure supplied state because the line pressure is instantly supplied to the port $32d$ of the control valve 32 via the port $37i$ of the 2-3 shift valve 37 and further to the constraining control oil chamber $30c$ via the port $32b$. As a result, the first brake $B_1$ is maintained in its engaged state without being released so that the downshift is quickly and smoothly effected by the single operation.

If, on the other hand, the manual valve 62 is shifted to the R range, the line pressure is supplied from the R range port to the second clutch hydraulic servo $C_2$ and its accumulator $2_2$. At this time, as before, the throttle pressure control valve 5 is controlled to the proper level by the electric signal coming from the control unit, and the oil pressure having acted upon the accumulator control valve 20, and thereby reduced from the line pressure, is supplied to the back pressure chambers $7_1$ to $7_4$ of the accumulators $2_1$ to $2_4$ to control the back pressure of the accumulator $2_2$. As a result, the oil pressure of the hydraulic servo $C_2$ is controlled to correspond to the engagement characteristics of the second clutch $C_2$ so that the shifts from the N to R ranges and from the D to R ranges can be smoothly effected. In this reverse (R) range, when the vehicle is running at a predetermined low speed, e.g., 7 Km/H or substantially halted, the 1-2 shift valve 36 is in its upper half position, and the line pressure from the R range port is supplied to the second brake hydraulic servo $B_2$ through the two-way check valve via the ports $36f$ and $36e$.

In reverse, moreover, in which the second clutch $C_2$ and the second brake $B_2$ are engaged, the rotation of the input shaft 15 is transmitted through the second clutch $C_2$ to the sun gear S. Since, moreover, the larger ring gear $R_2$ is stopped by the second brake $B_2$, the rotation of the sun gear S is reversed and transmitted to the carrier CR, while reversing the smaller ring gear $R_1$ idly, so that these reverse rotations are extracted from the output gear 13. In reverse if the vehicle is coasting at a predetermined speed or higher, the second solenoid valve $S_L2$ is turned ON to switch the 1-2 shift valve 36 to its lower half position. In this state, no oil pressure is supplied to the second brake hydraulic servo $B_2$ so that the aforementioned reverse state is not achieved.

When the manual valve 62 is shifted to the 2nd range the line pressure of the 2nd range port is supplied to the constraining control oil chamber $39h$ of the 3-4 shift valve 39 so that this valve 39 is blocked from moving to its upper half position, i.e., the 4th speed position. Moreover, the line pressure of the 2nd range port is supplied to the constraining control oil chamber $80b$ of the C3 timing valve 80 to hold this valve 80 in its right-hand half position so that the third clutch hydraulic servo $C_3$ is always supplied with the oil pressure in the 1st, 2nd and 3rd speeds. As a result, the input shaft 15 and the smaller ring gear $R_1$ are connected through the third clutch C3 so that engine braking is established by eliminating the coasting of the vehicle, which might otherwise be caused by overrun of the second one-way clutch F0.

If the manual valve 62 is shifted to the 1st range, the line pressure of the 1st range port is supplied to the constraining control oil chamber $37e$ of the 2-3 shift valve 37 so that this valve 37 is blocked from moving to its upper half position, i.e., the position for the 3rd and 4th speeds. The line pressure of the 1st range port is reduced by low modulator valve 79. This modulated pressure is supplied through the two-way check valve to the port $36f$ of the 1-2 shift valve 36 and further to the second brake hydraulic servo $B_2$ in 1st speed. The embodiment thus far described uses the $B_1$ modulator control valve 32, but valve 32 is not always indispensable.

In the above-described embodiment the fourth clutch C0 and the third clutch C3 are arranged adjacent to each other and share in common their outer cylinder, spring and spring retainer to shorten the axial size.

Figure 1:
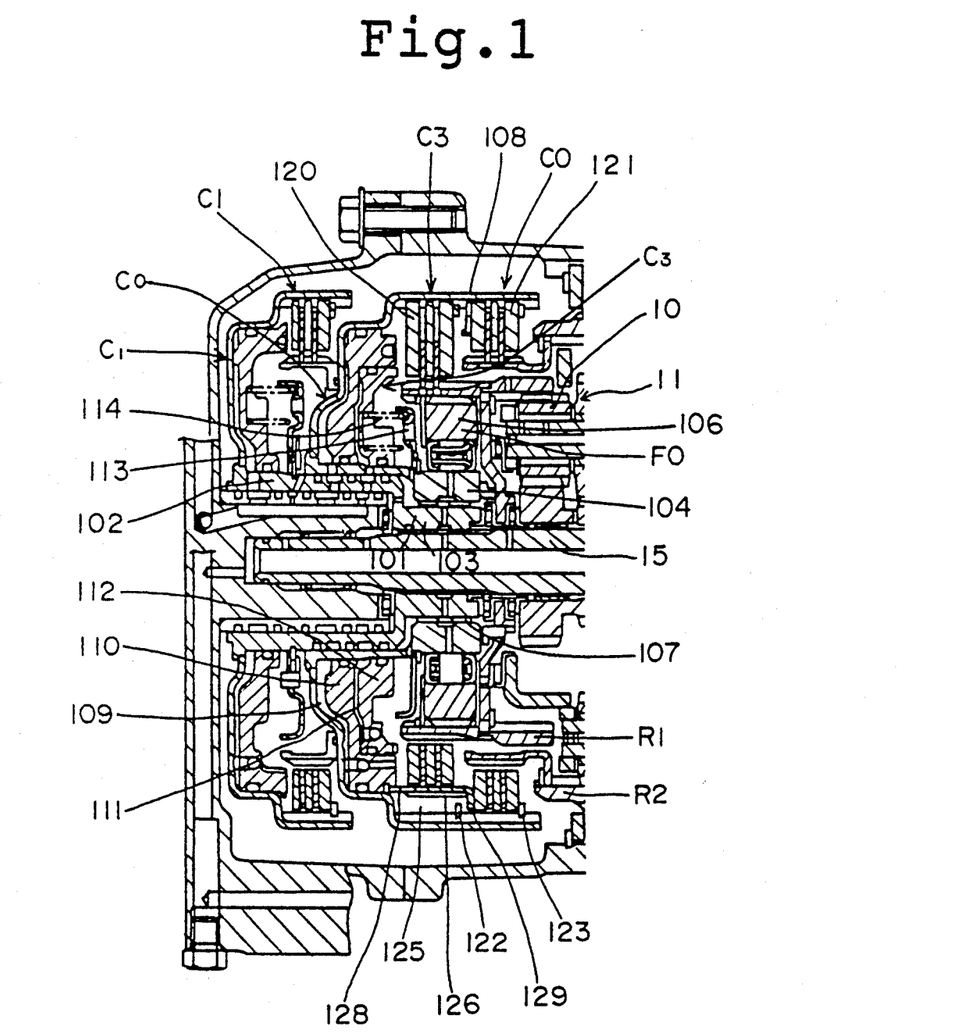
FIG. 1 is an enlarged section showing a fourth clutch C0 and a third clutch C3.

In FIG. 1, reference numeral 101 designates an inner cylinder of the first clutch C1, which is splined to the input shaft 15 and formed with a larger-diameter portion 102 and a smaller-diameter portion 103. This latter portion 103 supports an inner cylinder 104, which forms the inner race of the one-way clutch F0, rotatably through a bushing 107. The one way clutch F0 has its outer race 106 splined to the single planetary gear R1. The aforementioned inner cylinder 104 is joined to an outer cylinder 108 and 104 and 108 together are the equivalent of the aforementioned connecting member 16 and together form a first annular cylinder chamber 109. In this first annular cylinder chamber 109, there is slidably arranged a first annular piston 110 to form the fourth clutch C0 hydraulic servo C0. This first annular piston 110 has a dish-shaped section forming a second annular cylinder chamber 111 together with the aforementioned inner cylinder 104. In this second annular cylinder chamber 111, moreover, there is slidably arranged a second annular piston 112 which forms the third clutch C3 hydraulic servo C3. In the inner cylinder 104 is a spring retainer 113 which faces the second annular piston 112. A spring is interposed between spring retainer 113 and second annular piston 112. To the aforementioned outer cylinder 108 are splined a third clutch thin disc 120 and a fourth clutch thin disc 121, which have their axial movements restricted by snap rings 122 and 123, respectively. Thus, the aforementioned first annular piston 110 is axially moved, by operation of hydraulic servo $C_0$ for the fourth clutch C0 in response to oil pressure to bring the thin disc 121 of the fourth clutch into and out of engagement. Likewise, the aforementioned second annular piston 112 is axially moved, when the hydraulic servo C3 for the third clutch C3 is supplied with the oil, to bring the thin disc 120 of the third clutch into and out of engagement.

The third clutch C3 and the fourth clutch C0 must operate independently of each other so that they do not interfere with each other. For this reason, the aforementioned third clutch thin disc 120 is formed with grooves 125 which are arranged circumferentially with a predetermined spacing to allow apply tube 126 to extend therethrough. Apply tube 126 is arranged between the aforementioned first annular piston 110 and the fourth clutch thin disc 121 to bring this disc 121 into and out of engagement in accordance with the axial movement of the first annular piston 110.

Figure 6:
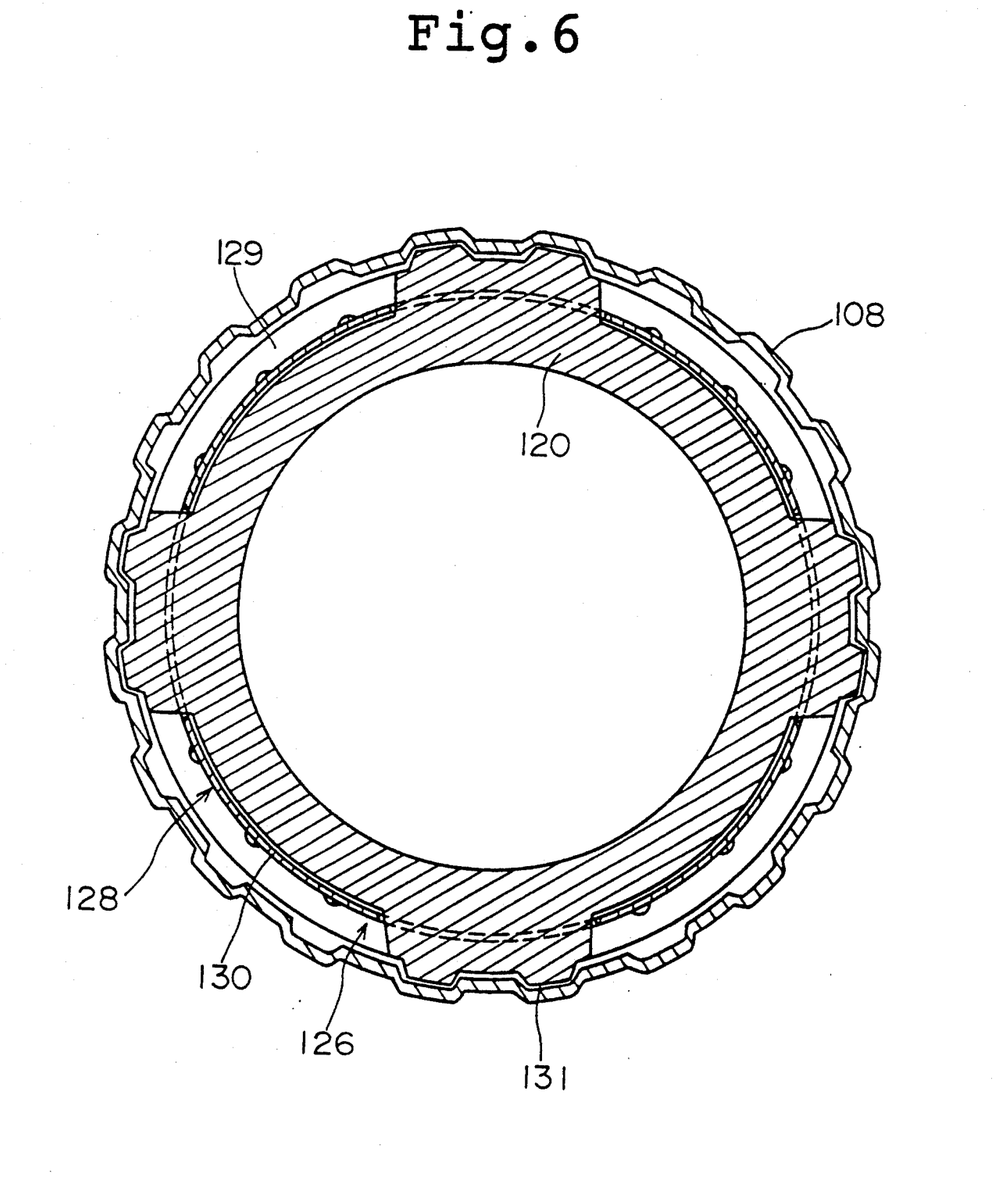
FIG. 6 is a section showing the arrangement of the apply tubes.

FIG. 6 is a section showing the arrangement of the apply tube. In FIG. 6, the numeral 108 designates the outer cylinder, and the numeral 126 designates one of the apply tubes. This apply tube 126 is formed with a sleeve portion 128 and a flange portion 129 formed at one end of said sleeve portion 128, sleeve portion 128 constituting a pressure-applying portion facing the aforementioned thin disc 121 (as shown in FIG. 1). The aforementioned sleeve portion 128 has circumferential cutouts in its distal end at a plurality of positions so that it is formed into a comb having a plurality of teeth 130. These teeth 130 extend through the aforementioned grooves 125 to transmit the motions of the first annular piston 110 to the thin disc 121. Incidentally, a plurality of rotation suppressing ridges 131 are formed to position the aforementioned apply tube 126 in the outer cylinder 108 to thereby prevent its rotation.

We claim:

1. An automatic transmission comprising:

an outer cylinder;

an inner cylinder fixed in said outer cylinder to define a first annular cylindrical chamber therebetween;

a first annular piston slidably mounted in said first annular chamber;

a second annular cylindrical chamber between said first annular piston and said inner cylinder;

a second annual piston slidably mounted in said second annual cylindrical chamber;

first and second sets of multi-disc clutches arranged axially in tandem in said outer cylinder and adapted to be engaged or released independently of each other, said first multi-disc clutch being engageable by said second annular piston and having a peripheral edge portion with axially extending grooves; and an apply tube coaxial with and engageable by said first annular piston and extending between said first annular piston and said second multi-disc clutch, said apply tube having plural protrusions extending through said grooves for engaging said second multi-disc clutch.

2. An automatic transmission in accordance with claim 1 wherein said first and second sets of multi-disc clutches are simultaneously engaged in at least one gear stage.

3. An automatic transmission in accordance with claim 1 wherein said apply tube further comprises a flange integral with distal ends of said plural protrusions, said flange presenting a flat surface parallel to and facing discs of said second multi-disc clutch.

4. An automatic transmission in accordance with claim 3 wherein said flange is splined to said outer cylinder.

* * * * *

UNITED STATES PATENT AND TRADEMARK OFFICE
CERTIFICATE OF CORRECTION

PATENT NO. : 5,230,411
DATED : July 27, 1993
INVENTOR(S) : Nishida, et. al.

It is certified that error appears in the above-indentified patent and that said Letters Patent is hereby corrected as shown below:

Col. 2, line 58, after "P1'" delete the comma ",".

Col. 3, line 4, "ear" should read --gear--.

Col. 4, line 17, begin a new paragraph with "The";

line 38, "-3" should read --2-3--;

Col. 5, line 14, after "output" insert --port--;

line 20, before "20" insert --the pressure control port 20b of the accumulator control valve--; and line 42, delete "In" insert --At--.

Col. 6, line 37, delete "via the";

line 38, after "a" insert --via the line pressure supply port 36a and the output port 36b and--;

UNITED STATES PATENT AND TRADEMARK OFFICE
CERTIFICATE OF CORRECTION

PATENT NO. : 5,230,411
DATED : July 27, 1993
INVENTOR(S) : Nishida, et. al.

It is certified that error appears in the above-indentified patent and that said Letters Patent is hereby corrected as shown below:

Col. 7, line 47, delete "39i8" and insert --39i--; and line 52, delete "$2_1$" and insert --$2_3$--.

Col. 8, line 14, delete "$2_1$" and insert --$2_3$--;

line 58, after "above" insert a comma --,--.

Col. 9, line 61, after "this" delete the comma ",".

Col. 11, line 2, delete "2-3shift" insert --2-3 shift--;

line 68, begin a new paragraph with "The".

Col. 13, line 14, delete "annual" insert --annular--; and line 15, delete "annual" insert --annular--.

Signed and Sealed this

Seventeenth Day of May, 1994

Attest:

BRUCE LEHMAN

*Attesting Officer*   *Commissioner of Patents and Trademarks*